United States Patent [19]

Jahn

[11] Patent Number: 4,601,873

[45] Date of Patent: Jul. 22, 1986

[54] METHOD OF AVOIDING OR INHIBITING INTERMIXING OF THE ATMOSPHERE WHICH EXISTS IN AN ENCLOSED SPACE WITH A GASEOUS SUBSTANCE PRESENT IN THE SAME SPACE

[76] Inventor: Hermann Jahn, Griegstr. 13, D-8000 München 40, Fed. Rep. of Germany

[21] Appl. No.: 398,392

[22] Filed: Jul. 14, 1982

[30] Foreign Application Priority Data

Jul. 14, 1981 [DE] Fed. Rep. of Germany ....... 3127804

[51] Int. Cl.[4] ........................ G21C 9/00; G21C 19/00
[52] U.S. Cl. .................................... 376/308; 376/305; 376/283; 376/279; 376/277; 376/300; 55/17
[58] Field of Search ............... 376/308, 309, 310, 305, 376/283, 279, 277, 300; 55/17

[56] References Cited

U.S. PATENT DOCUMENTS

| | | | |
|---|---|---|---|
| 2,449,436 | 9/1948 | Williamson | 169/1 |
| 3,143,631 | 8/1964 | John et al. | 219/74 |
| 3,307,913 | 3/1967 | Chave | 376/300 X |
| 3,437,558 | 4/1969 | Gunson et al. | 376/171 X |
| 3,658,996 | 4/1972 | Frumerman et al. | 376/300 X |
| 3,937,796 | 2/1976 | Bhan | 376/300 X |
| 4,199,329 | 4/1980 | Bouchard | 55/17 |
| 4,344,782 | 8/1982 | Groszstuck | 55/17 X |

FOREIGN PATENT DOCUMENTS

| | | | |
|---|---|---|---|
| 2805476 | 8/1979 | Fed. Rep. of Germany | 376/308 |
| 2928425 | 2/1980 | Fed. Rep. of Germany | 376/308 |
| 2364932 | 4/1978 | France . | |

OTHER PUBLICATIONS

*American Nuclear Society*, "Layering and Combustion in the HTGR Containment Following Depressurization Accident, Ippei Omata, Jun. 77, p. 315.

*Primary Examiner*—Deborah L. Kyle
*Assistant Examiner*—Dan Wasil
*Attorney, Agent, or Firm*—Michael J. Striker

[57] ABSTRACT

In a method of inhibiting or avoiding intermixing of the atmosphere which exists in a closed nuclear reactor containment space with a gaseous substance present in the same space a change in density of the atmosphere is induced in either lower or upper area of the space such that a stable atmosphere stratified into superimposed layers is formed in that space due to the change in density.

19 Claims, 2 Drawing Figures

METHOD OF AVOIDING OR INHIBITING INTERMIXING OF THE ATMOSPHERE WHICH EXISTS IN AN ENCLOSED SPACE WITH A GASEOUS SUBSTANCE PRESENT IN THE SAME SPACE

BACKGROUND OF THE INVENTION

In the present context an enclosed space is to refer, quite generally, to a zone which are sealed, largely or entirely, by a structural enclosure. Such a zone may be, for instance, a closed building, a closed container, or an area which is substantially enclosed within a building.

In industry, technical equipment often is housed in sealed spaces. When an operational disturbance or an accident occurs it may happen that a substance escapes which is contained, for example, in a pipeline system of a plant or in vessels associated with such plant or equipment. This may happen because a rupture or leak has formed. If the substance leaking out is such as to react chemically or physically with the atmosphere surrounding the plant, this is a potential risk for the plant. If the substance is an inflammable, volatile liquid, like benzene, alcohol, or the like, or an inflammable gas, like methane, hydrogen, or the like, the danger that a normal or explosion-type combustion will occur grows with the length of time such substance issues from the plant and has time to intermix, for instance, with the oxygen of the air.

If the substance so leaking is a chemically aggressive gas, there is a risk that even elements or parts of the plant at a great distance from the leak will be attacked or endangered if the gas spreads at sufficiently high concentration.

If the gas or gas mixture released by the chemical engineering plant or having formed subsequently, is a poisonous substance an essential gain in safety may be achieved if the latter can be confined to a limited area of the plant, thereby avoiding or at least restricting or delaying its release through such means as ventilation ducts, skylights, doors, and hallways, or the like, in order that protective measures devised for disaster control may be prepared and carried through successfully.

As an example of a conceivable accident in the chemical industry, reference may be made to the release of chlorine gas from a container or process circuit. This poisonous gas is especially dangerous when released close to the ground. If no more than minor heating occurs, such as by a fire breaking out at the same time, this gas may escape readily in an upward or lateral direction from a building and then cool down rapidly to such an extent that it will spread disastrously in the surroundings near to the ground. This may pose a threat to entire towns, particularly if meteorological conditions of inversion and unfavorable wind conditions prevail so that protective measures devised for disaster control, such as the evacuation of the population, cannot be carried out effectively. On the other hand, it is conceivable that the gas in question, which is relatively heavy at normal temperatures, will flow out in a downward or lateral direction into lower zones, for example through passages and gates although it was initially released in an upper region. It is possible as well that this gas will pass through ventilation ducts, even if the air circulating equipment is shut off, thus reaching zones which should remain accessible to afford an opportunity of controlling the accident. In any such case even reduced or delayed release would amount to an effective protective measure.

Similar, yet specific dangers threaten with nuclear power plants featuring light water reactors. Light water reactors comprise a primary coolant system in which "ordinary" water is used as the coolant.

In the case of light water reactors, allowance is made for the occurrence of serious accidents by way of technical safety measures providing for automatic shutdown of the light water reactor and switching on additional specific auxiliary means.

A rupture, or at least a leakage, occurring in a primary coolant line is called a loss of coolant accident and classified as a serious accident. When such loss of coolant accidents occur, for instance, molecular hydrogen may be formed within a short period of time by a metal-water reaction in the core area.

The explosiveness of an air/hydrogen mixture highly depends on the concentration of the reaction partners present. If, in such event, the proportion of air and of the oxygen available in the air reach a sufficiently high concentration, the high proportion of hydrogen will cause the formation of a gas mixture which may very easily be ignited. However, in the case of a combustion or explosion the effect may be of limited intensity if the amount of air or of the oxygen it contains which have become mixed with the hydrogen is insufficient or only partly sufficient to react with all of the hydrogen present. If an intermixing under such circumstances can be limited or avoided from the very beginning by not supplying further air, i.e. additional oxygen, to the place of the high hydrogen concentration, this will clearly reduce the hazardousness of the accident in question. Gaining but a few hours of time will play an essential role, all the more so as the short-lived fission products then will already have become decomposed to a large extent by natural decay.

It was suggested to fill the safety containments of a reactor with an inert gas during operation so as to prevent any inflammation or explosion of a substance reacting with the oxygen of air. However, this involves considerable disadvantages in normal operation and obviously cannot be realized with all plants.

SUMMARY OF THE INVENTION

It is, therefore, an object of this invention to provide a method of avoiding or inhibiting intermixing of the atmosphere which exists in an enclosed space with a gaseous substance present in the same space.

This and other objects are met, in accordance with the invention, in that a change in density of the atmosphere is induced in one area of said space such that an essentially stable atmosphere stratified into superimposed layers is formed because of the change in density.

The method of the invention permits the formation of a substantially stable thermal stratification and/or mixture stratification in an enclosed space. The method according to the invention causes changes in density such that the atmosphere becomes stratified. As soon as a stratified atmosphere is established, the differences in density between the strata of the atmosphere balance only slowly by diffusion processes, as analyses and experiments have shown.

The method according to the invention can be realized in an extremely simple manner.

Fundamentally, the invention provides two possibilities of effecting a change in density, either by introducing a gas or a liquid or by heat input and/or heat removal. It is also feasible to realize both possibilities at the same time or in timed sequence. A particularly simple way of realizing the method according to the invention by gas supply resides in disposing a heating means in the ceiling area of the space and/or a cooling means in the bottom area of the space. These means may be provided in the upper area, for instance, at the ceiling of the space and in the lower area, for instance, at the bottom of the space. It is also possible to provide for heating or cooling from outside, for instance by steam or water.

The subject matter of the invention will be described further, by way of example, with reference to the accompanying panying drawings:

DETAILED DESCRIPTION OF THE PREFERRED EMBODIMENTS

The method according to the invention will be described, by way of example, with reference to a loss of coolant accident in the safety containment of a reactor, referring to FIG. 1, the reactor being a pressurized water reactor.

Figure 1:
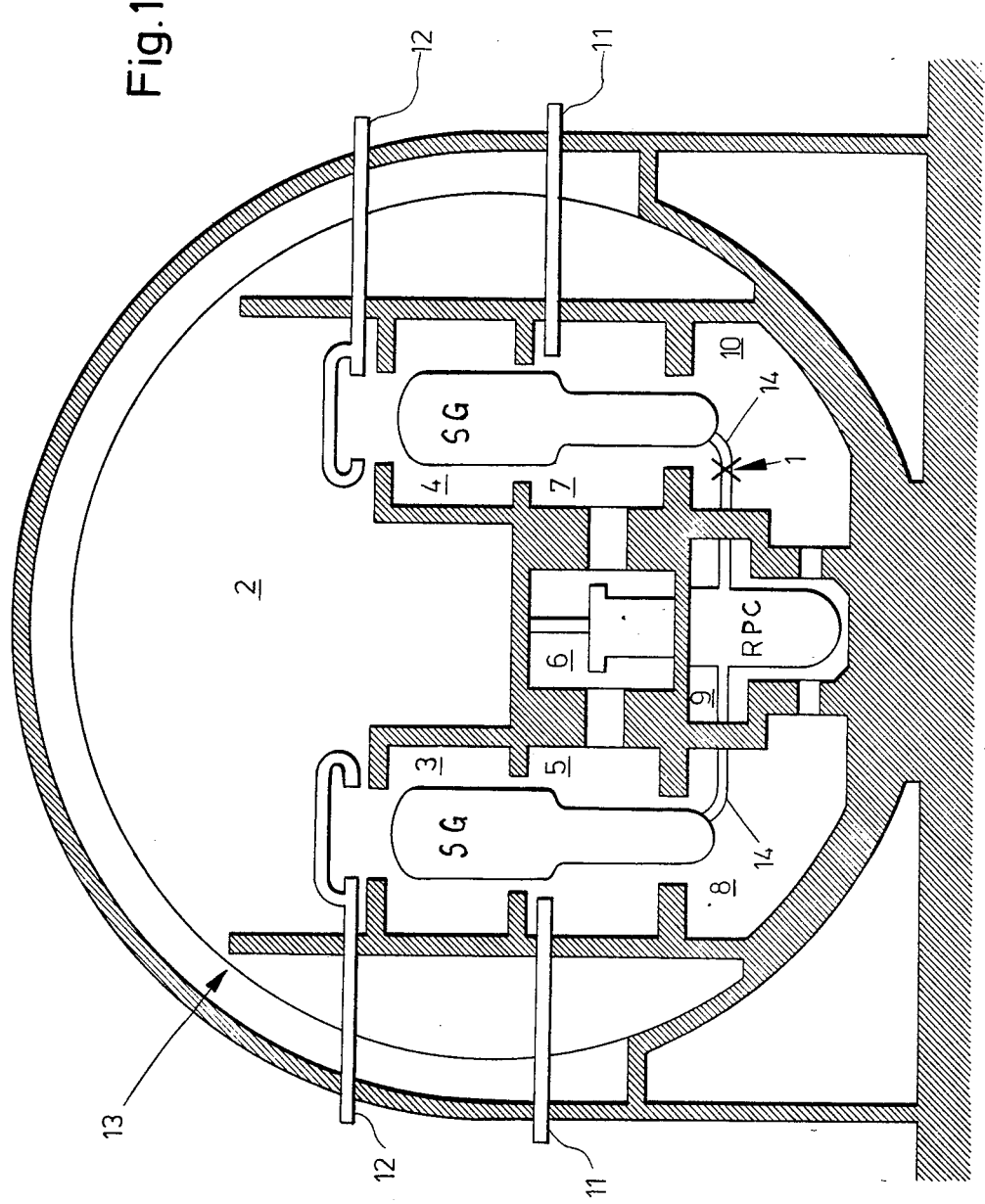
FIG. 1 is a diagrammatic sectional view of a safety containment of a nuclear reactor of the pressurized water type, including essential equipment inside the same.

In FIG. 1 reference numeral 13 designates the safety containment of a reactor. The interior of the safety containment is subdivided by partitions into areas which are in fluid communication, such as spaces 2 to 10. Each of the spaces communicates with no less than one adjacent space through overflow apertures.

The spaces 3, 5, 8, and 4, 7, 10 house steam generators SG which are connected by way of primary coolant lines 14 to a reactor pressure container RQC arranged in space 9. Reference numeral 1 marks the place at which a rupture of the primary coolant line is assumed to have taken place.

Gas feed lines 11 and 12 lead into the interior of the safety container 13. The gas feed lines 11 open into lower areas of the safety container, namely into spaces 8 and 10. The feed lines 12 lead through the cupula of the safety container 13, terminating in the upper area of the safety container in space 2.

In general, the gas feed lines 11 and 12 are laid so as to be protected at the inside by concrete walls and are passed to the outside of the safety container at a certain location. If desired, a manifold may be used. Control of the lines may be effected by remote controlled double instruments, as is the case with the sampling metering system.

If a loss of coolant accident has occurred, releasing coolant as well as hydrogen at the place of rupture 1 of the primary coolant line 14, the hydrogen escaping will spread in space 10 from which it may first pass on to the other spaces 5 to 9 communicating with space 10.

The method according to the invention makes it possible to prevent or at least inhibit the distribution of the hydrogen in the entire containment. In the case of the embodiment shown this is achieved by using the gas feed line 12 which is provided in the upper area of the safety container 13 to introduce a gas whose density is less than the density of the atmosphere in the safety container 13. It is assumed that the gas supplied is helium. The helium supplied through the feed lines 12 spreads in the area of the cupula of the safety container 13 where it mixes with the existing atmosphere. In this way the specific density of the atmosphere in the upper area of the safety container 13 is reduced, adopting a value which is lower than that of the specific density of the atmosphere in the lower area of the safety container 13.

The pressure drop reduced by the supply of, for instance, helium would cause a pressure balancing flow between the volumes of space 2, on the one hand, and spaces 3 to 10 which, in general, are called equipment spaces. This would mean introducing helium under pressure together with atmosphere from space 2 into spaces 3 and 4, while the air in space 2 would mix with the remaining helium by free convection. By virtue of this process the spaces 2, 3, and 4 have a lower density than spaces 5 to 10 disposed at a lower level so that a stable stratification is obtained. If the difference between the specific density of the atmosphere enriched with helium gas and the specific density of the atmosphere prevailing in spaces 5 to 10 is sufficiently great, a stable superimposed barrier layer will form to prevent intermixing by convection between the hydrogen in spaces 5 to 10 and the oxygen of the great volume contained in space 2, and vice versa.

The only oxygen available for reaction with the hydrogen issuing from the leak 1 in the primary coolant line 14 is the oxygen contained in the atmosphere in spaces 5 to 10. Under the conditions prevailing during an accident the proportion of oxygen in this very area should be clearly less than during normal operation.

It should further be noted that when fixing the quantity of helium gas to be supplied it must be kept in mind that, because of the leaking hydrogen, a change in specific density to be compensated and depending on the composition of the atmosphere will take place in spaces 5 to 10, too. This circumstance induced by the accident itself can be influenced advantageously by the method of the invention in that a heavy gas, preferably an inert gas, is introduced in addition through lines 11 so as to achieve at least partial balance of the change in density caused by the hydrogen.

It should be noted that when employing the method of the invention in the manner described above the simultaneous feeding through lines 11 and 12 may influence the above-mentioned overflow processes to such an extent that the pressure increases in spaces 2 and 5 to 10, respectively, are equalized or that controlled overflow is obtained.

The use of the method according to the invention in a chemical plant will be described with reference to FIG. 2 which shows such a plant diagrammatically. A vertically disposed boiler 201 is connected to a reservoir 202. Furthermore, the upper and lower ends of the boiler 201 are connected to a chemical reactor 203. The chemical plant consisting of the boiler 201, the reservoir 202, and the chemical reactor 203 is installed in a building 205. A cooling means 215 is provided in the lower area of the building 205, and a heating means 214 is provided in the upper area thereof. A gas feed line 213' opens into the interior of the building 205 in the lower area, approximately at one third of the height of the building 205. This gas feed line 213' is connected to a gas supply means 213 by way of valves not designated specifically. A gas feed line 212' opens into the upper area of the building, approximately at two thirds of the height of the building 205, this line being connected to a gas supply means 212 by way of valves not designated specifically. A building 207 housing auxiliary equipment and comprising a window 208 is located next to the building 205. A control stand 211 is arranged in the auxiliary equipment building 207 which is connected to the reactor building 205 by a walkable connecting passage 209.

Between the building 205 housing the chemical plant and the building 207 housing the auxiliary equipment there is an air conditioning unit 210, reference numeral 204 designating an air circulation fan which is indicated diagrammatically and may also comprise, for example, a heating or a cooling means. Connecting lines lead from the air circulation fan 204 to the buildings 205 and 207 where they end. Part of these connecting lines is connected to the suction end of the air circulation fan 204, and another part is connected to the output end of the air circulation fan 204. Those connecting lines connected to the inlet end of the air circulation fan 204 withdraw atmosphere from the upper areas of the buildings 205 and 207, and this atmosphere is introduced into the lower area of the buildings 205 and 207 through the other part of the connecting lines.

The connecting lines which are in fluid flow communication with the upper areas of the buildings 205 and 207 and lead to the suction end of the air circulation fan 204 are in fluid flow communication with the gas supply means 212 through a gas feed line 217'.

A gas feed line 216' establishes fluid flow communication between the gas supply means 213 and those connecting lines which lead into the lower areas of the buildings 205 and 207 and are connected to the outlet end of the air circulation fan 204.

Controllable valves are provided in the gas feed lines 216' ahd 217' to control the rate of flow passing through these lines 216' and 217'. These valves are not designated specifically.

Figure 2:
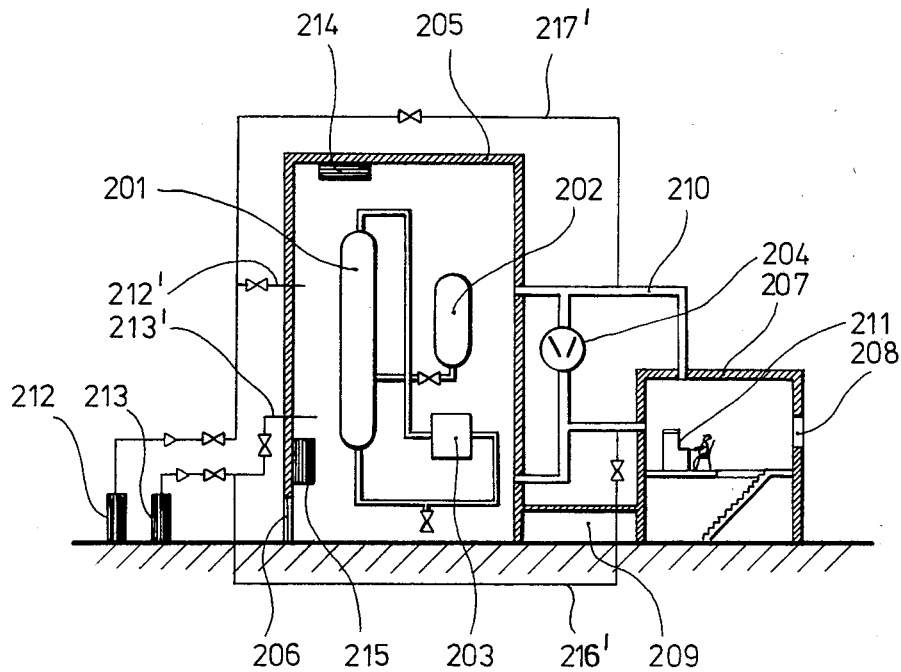
FIG. 2 is a diagrammatic sectional view of a plant for carrying out a chemical process.

The positions shown in FIG. 2 of the heating means 214 and the cooling means 215 are given as an example only. The cooling means 215 also could be provided in the form of a cooling coil placed, for instance, in the floor of the building 205.

If a disturbance or an accident occurs during the operation of the chemical plant, for example releasing a gaseous substance whose specific gravity is higher than that of air from the upper end of the boiler 201, this gaseous substance will sink inside the building 205. As soon as the accident has been determined, a gas will be introduced from the gas supply means 213 through the gas feed line 213'.

The type of gas provided in the gas supply means 213 depends on the kind of chemical process employed and the gaseous substances it produces. The positions of the gas feed lines which open into the building 205 and of which only gas feed line 213' is shown in FIG. 2 depend, moreover, on the structure of the chemical plant and on its positional relationship within the building 205.

If, as is the case with the example chosen, a dangerous gaseous substance must be expected whose specific density is greater than that of air at the temperatures prevailing, preferably the gas supply means 213 will contain a gas whose specific density is higher than that of the dangerous gaseous substance at the temperature conditions prevailing in the building 205. If a leak has occurred at the upper end of the boiler 201, setting free the dangerous gaseous substance, gas from the gas supply means 213 will be introduced through the gas feed line 213' into the interior of the building 205 by suitably controlling the valves provided in the gas feed line 213. This gas, fed into the interior, will sink to the bottom of the building 205. As time passes, the gas flowing into the building 205 through the gas feed line 213' will fill or enrich the lower area of the building. The dangerous gaseous substance flowing out of the upper end of the boiler 201 and sinking down will reach the area of the building 205 in which the gas introduced has become distributed. The dangerous gaseous substance will float on the gas introduced because, as assumed, it has a lower specific density than the gas introduced under the existing temperature conditions. Further supply of gas makes it possible to shift the dangerous gaseous substance into the upper area of the building 205 so that it will be located in this upper area of the building 205, remaining remote from the lower area of the building 205.

It should further be noted that not only the gas supplied through gas feed line 213' but also the dangerous gaseous substance exiting out of the upper end of the boiler 201 will mix at least partially with the air contained in the building 205 so that the relationships will change somewhat as regards the different specific densities. In the present case, the mean density of the mixture of gas supplied and air available in the lower area of the building 205 will be lower than the specific density of the gas supplied but higher than that of the atmosphere in the upper area mixed with the poisonous substance. The latter atmosphere, moreover, may be reduced by additional introduction of a light gas or by heating in the upper area.

It should also be considered that the introduction of gas as well as the emergence of the dangerous gaseous substance cause a pressure rise within the building 205. If connecting lines to an air conditioning unit are provided, as is the case with the present example, a hazardous gaseous substance may issue through these connecting lines. In the case at issue, for instance, this may be prevented substantially by introducing a low specific density gas through gas feed line 217' into the connecting lines of the air conditioning unit and introducing the same gas already fed through gas feed line 213' also through gas feed line 216'. This means that essentially a gas having a high specific density would flow into the lower area of the building 205, while a gas of low specific density would reach the upper area of the building 205. In this manner the stratification of densities prevailing inside the building 205 may be maintained or even enhanced.

The connecting lines establishing flow communication between the building 207 which houses the auxiliary equipment and the air conditioning unit 210 contain blocking means adapted to be closed, mainly for reasons of safety, gas tight so that no person working in the building 207 will be endangered. If, on the other hand, nobody is left in the building 207 because of an actual danger, the building 207 can be filled through the connecting lines leading to the air conditioning unit 210 with at least one of the gases available in the gas supply means 212 and 213 so that it is guaranteed that no dangerous gaseous substance will enter the building 207 housing the auxiliary equipment.

As an additional measure, the cooling means 215 arranged in the lower area of the building 205 may be switched on to produce an additional rise of the mean density of the gas mixture available in this area. Switching on of the heating means 214 so as to reduce the density of the gas mixture in the upper area of the building 205 may be advisable, depending on the given circumstances and taking into consideration the pressure conditions prevailing within the building 205.

What is claimed is:

1. In a method of avoiding explosive mixtures of hydrogen with air, or of hydrogen with air and steam in the atmosphere within the safety containment of a nuclear reactor in the course of accidents, said safety containment having an upper area and a lower area containing atmospheres of different densities, the improvement comprising reducing the density of the atmosphere in the upper area of said safety containment and increasing the density of the atmosphere in said lower area so as to produce in said safety containment a substantially stable atmosphere stratified into superposed layers of non-explosive mixtures of hydrogen, air and steam so as to prevent further intermixing between hydrogen and oxygen of the air, caused by convection between said lower area and said upper area and avoid said explosive mixtures.

2. In a method of avoiding explosive mixtures of hydrogen with air, or of hydrogen with air and steam in the atmosphere within the safety containment of a nuclear reactor in the course of accidents, said safety containment having an upper area and a lower area containing atmospheres of different densities, the improvement comprising increasing the density of the atmosphere in said lower area so as to produce in said safety containment a substantially stable atmosphere stratified into superposed layers of mixture of hydrogen, air and steam so as to prevent further intermixing between hydrogen and oxygen of the air caused by convection between said lower area and said upper area and avoid said explosive mixtures.

3. In a method of avoiding explosive mixtures of hydrogen with air, or of hydrogen with air and steam in the atmosphere within the safety containment of a nuclear reactor in the course of accidents, said safety containment having an upper area and a lower area containing atmospheres of different densities, the improvement comprising reducing the density of the atmosphere in the upper area of said safety containment and increasing the density of the atmosphere in said lower area so as to produce in said safety containment a substantially stable atmosphere stratified into superposed layers of non-explosive mixtures of hydrogen, air and steam so as to prevent further intermixing between hydrogen and oxygen of the air caused by convection between said lower area and said upper area and to avoid said explosive mixtures, said reducing step and said increasing step each including supplying gas to the atmosphere of a respective area of the safety containment.

4. In a method of avoiding explosive mixtures of hydrogen with air, or of hydrogen with air and steam in the atmosphere within the safety containment of a nuclear reactor in the course of accidents, said safety containment having an upper area and a lower area containing atmospheres of different densities, the improvement comprising reducing the density of the atmosphere in the upper area of said safety containment and increasing the density of the atmosphere in said lower area so as to produce in said safety containment a substantially stable atmosphere stratified into superposed layers of non-explosive mixtures of hydrogen, air and steam so as to prevent further intermixing between hydrogen and oxygen of the air, caused by convection between said lower area and said upper area and to avoid said explosive mixtures, said reducing step including supplying heat to said upper area, said increasing step including substracting heat from said lower area.

5. The method as claimed in claim 1, wherein the density of the atmosphere is reduced in the upper area of the safety containment by supplying a gas or a gas mixture.

6. The method as claimed in claim 5, wherein the gas supplied is an inert gas.

7. The method as claimed in claim 1, wherein the density of the atmosphere in the upper area is reduced by raising the temperature of the atmosphere in said upper area.

8. The method as claimed in claim 7, wherein a fluid medium whose temperature is higher than the temperature of the atmosphere in the upper area of the safety is supplied to the upper area of the safety to raise the temperature of the atmosphere therein.

9. The method as claimed in claim 7, wherein at least one heating means arranged in the upper area of the safety containment is used to raise the temperature of the atmosphere.

10. The method as claimed in claim 7, wherein said safety containment is enclosed by wall means, said wall means being heated at least partially to raise the temperature of the atmosphere in the upper area of the safety containment.

11. The method as claimed in claim 10, wherein the increase in temperature is effected directly or indirectly from outside.

12. The method as claimed in claim 1, wherein the density of the atmosphere in said upper area is reduced by feeding a fluid medium into said upper area and by raising the temperature of the atmosphere in said upper area of the safety containment.

13. The method as claimed in claim 1, wherein the density of the atmosphere in said lower area is increased by feeding a gas or a gas mixture into the lower area of the safety containment.

14. The method as claimed in claim 13, wherein the gas used is an inert gas.

15. The method as claimed in claim 1, wherein the density of the atmosphere in said lower area is increased by lowering the temperature of the atmosphere in the lower area of the safety containment.

16. The method as claimed in claim 15, wherein a fluid medium whose temperature is lower than the temperature of the atmosphere in the lower area of the safety containment is supplied to the lower area of the safety containment to lower the temperature of the atmosphere therein.

17. The method as claimed on claim 15, wherein said safety containment is enclosed by wall means, said wall means being cooled at least partially to the lower temperature in the lower area of the safety containment.

18. The method as claimed in claim 16, wherein the lowering of the temperature is effected directly or indirectly from outside.

19. The method as claimed in claim 1, wherein the density of the atmosphere in said lower area is increased by feeding a fluid medium into the lower area of the safety containment and by lowering the temperature of the atmosphere in the lower area of the safety containment.

* * * * *